Nov. 30, 1954     F. M. DARNER     2,695,942
WORK-ENGAGING CONTACT EQUIPMENT
Filed June 14, 1949     5 Sheets-Sheet 1
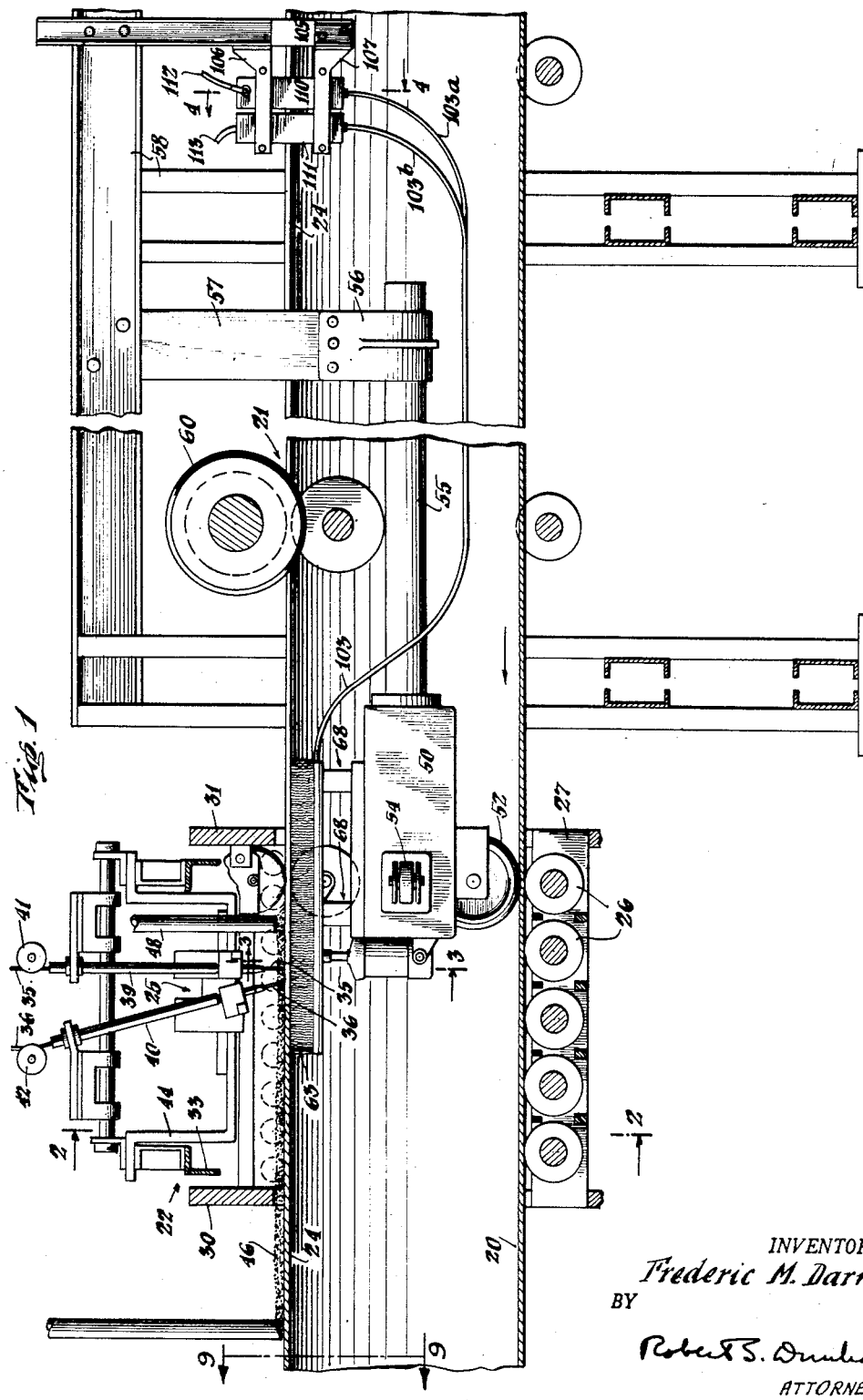
INVENTOR.
*Frederic M. Darner*
BY
*Robert S. Dunham*
ATTORNEY

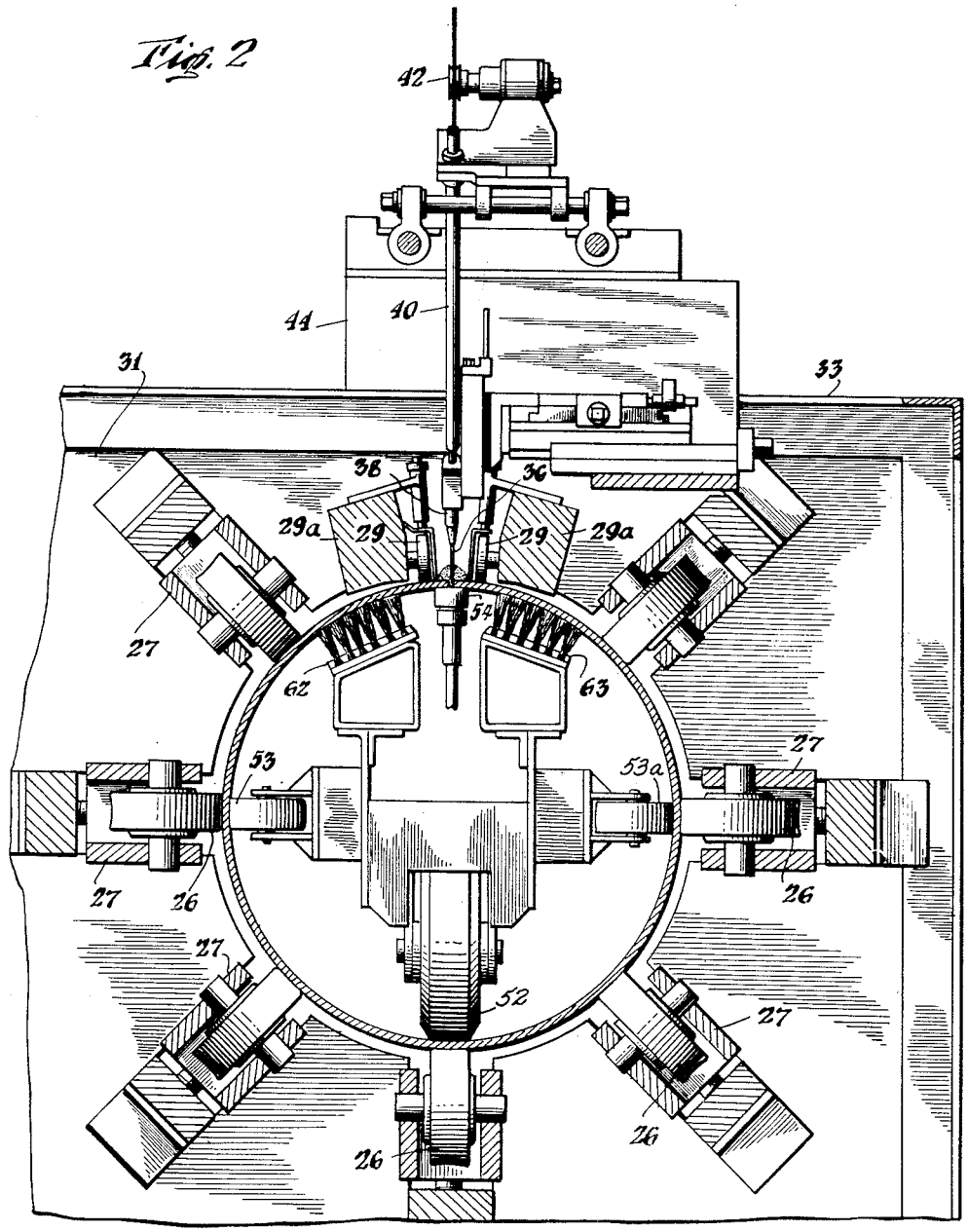

Nov. 30, 1954  F. M. DARNER  2,695,942
WORK-ENGAGING CONTACT EQUIPMENT
Filed June 14, 1949  5 Sheets-Sheet 3
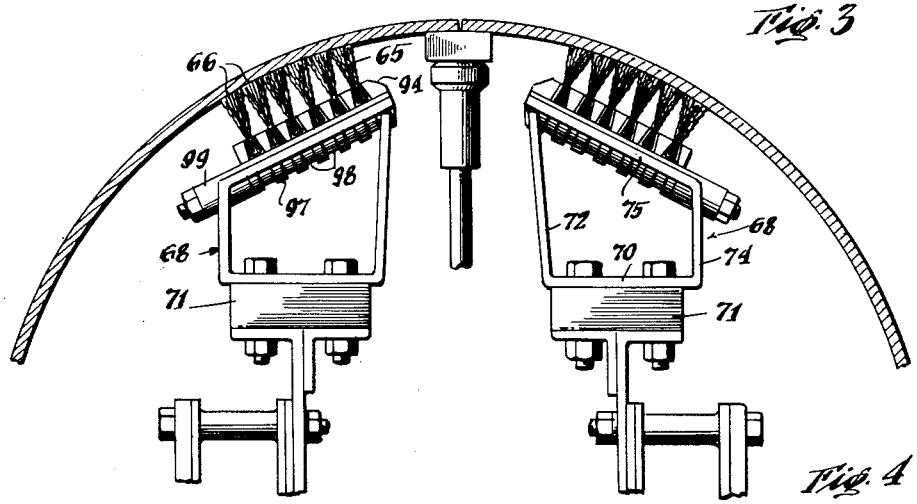
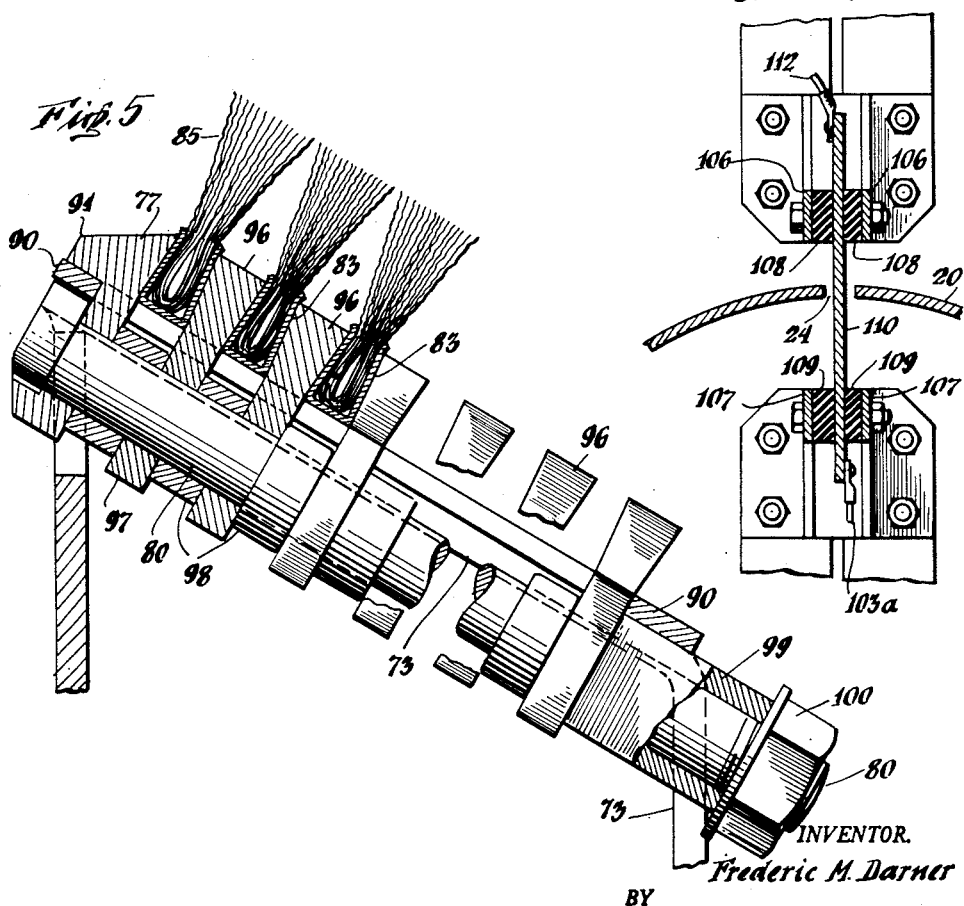
INVENTOR.
Frederic M. Darner
BY
Robert S. Dunham
ATTORNEY Nov. 30, 1954　　　F. M. DARNER　　　2,695,942
WORK-ENGAGING CONTACT EQUIPMENT
Filed June 14, 1949　　　5 Sheets-Sheet 4
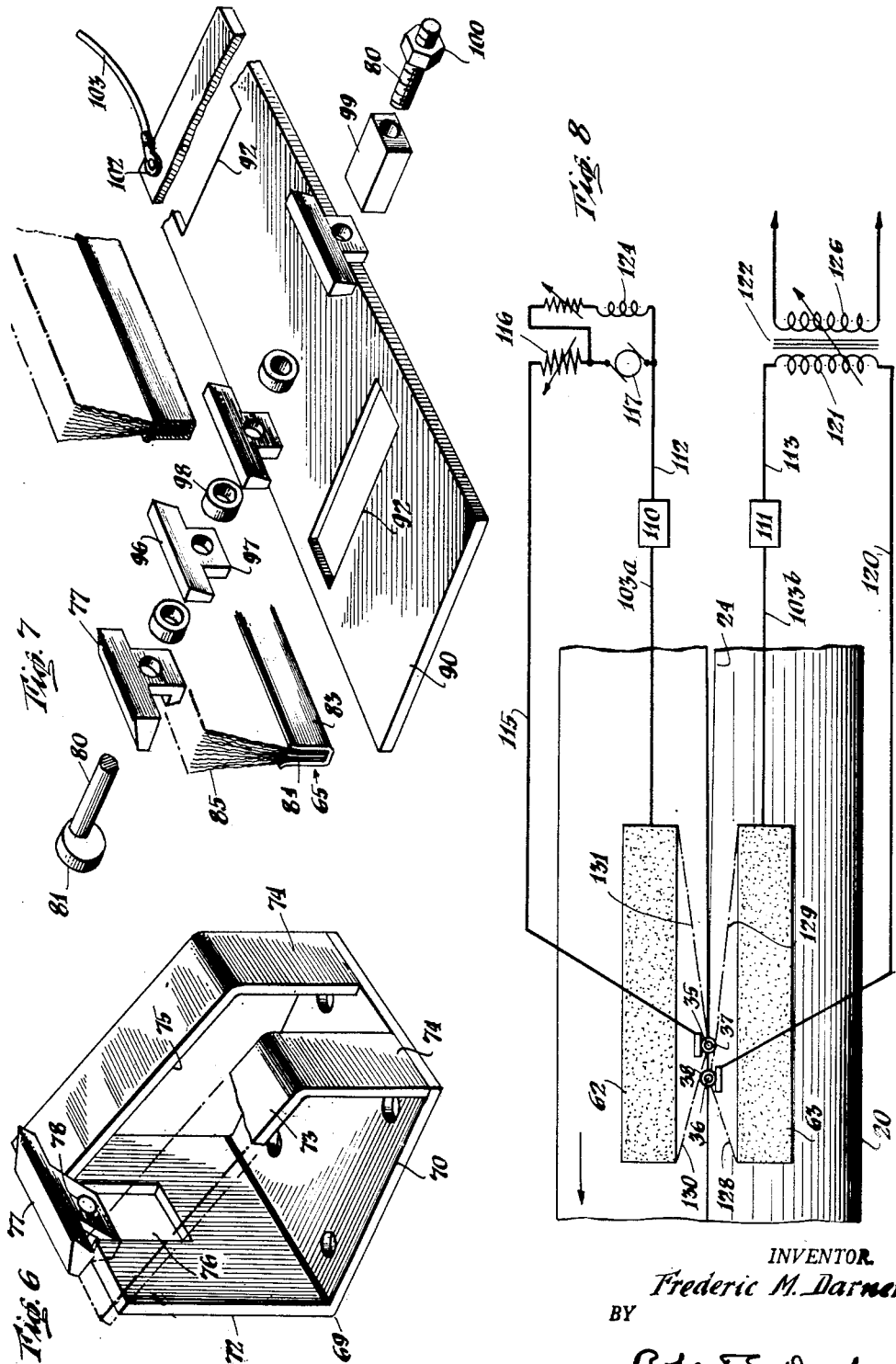
INVENTOR.
Frederic M. Darner
BY
Robert S. Dunham
ATTORNEY Nov. 30, 1954  F. M. DARNER  2,695,942
WORK-ENGAGING CONTACT EQUIPMENT
Filed June 14, 1949  5 Sheets-Sheet 5
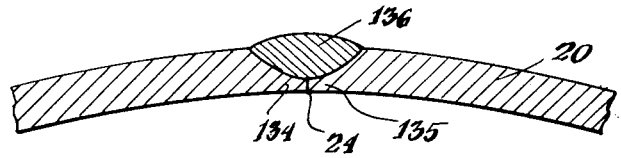
  
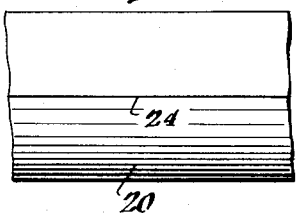 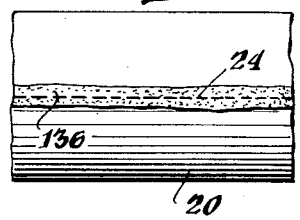 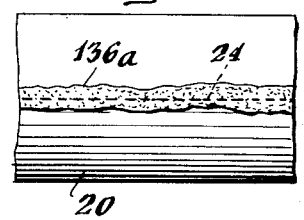
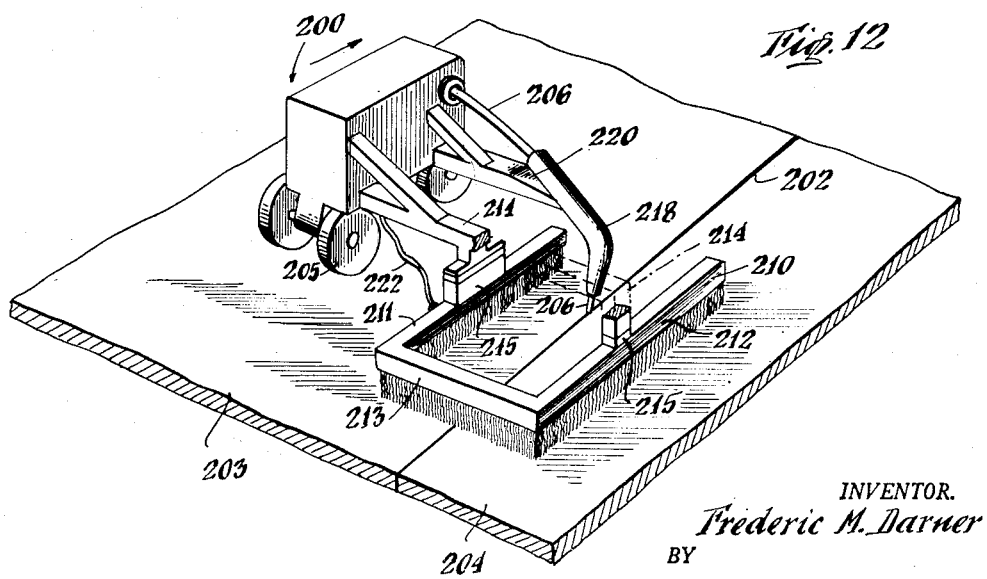
INVENTOR.
Frederic M. Darner
BY
Robert S. Dunham
ATTORNEY United States Patent Office 2,695,942
Patented Nov. 30, 1954

2,695,942

WORK-ENGAGING CONTACT EQUIPMENT

Frederic M. Darner, Shaker Heights, Ohio, assignor to Republic Steel Corporation, Cleveland, Ohio, a corporation of New Jersey Application June 14, 1949, Serial No. 99,103

16 Claims. (Cl. 219—6)

This invention relates to electrical welding apparatus, especially for welding a seam or joint along a predetermined path, wherein the welding apparatus and the work are arranged for motion of one relative to the other so that the point of welding operation travels along the desired path. In a more particular sense the invention is directed to current collecting or conducting means for such apparatus, particularly for apparatus of the arc welding type wherein there is a large current flow between one or more welding electrodes and the work by reason of the arc or arcs struck between the electrode means and the work. In a presently important and more specific respect, certain features of the invention are directed to welding apparatus wherein a seam is to be welded along a pipe blank, viz, a tubular structure having a longitudinal cleft to be closed by such welding operation. Although in generic respects the invention is applicable to work of various sizes, one specifically advantageous embodiment has been in pipe manufacture where the tubular structure and resulting pipe were of relatively large diameter, for example having a diameter of 20 inches to 30 inches or so, and were made from skelp, e. g. steel sheet or plate material, having a wall thickness or gauge of $3/16$ to $1/2$ inch, the work being presented as pipe blanks of relatively considerable length, i. e. up to 30 feet or so.

In electric arc welding operations, an electrode rod or wire which is consumed by transfer of its metal through a molten state to become part of the finished seam or joint, is disposed in close proximity to the meeting line of the pieces or edges to be welded, and an electric arc is maintained between the electrode and such edges or locality of the work. The path of current flow extends through the electrode rod or wire, then via the arc to the work, and returns to the source through the steel or other metallic body of the work. It may be noted that whereas the portion of the circuit extending from the arc, through the work and thence to one terminal of the source of arc current, is conveniently described herein as the return path or return part of the circuit, such reference has no necessary connection to the actual direction of current flow; the invention is applicable regardless of polarity of the circuit connections, and indeed is fully and peculiarly effective in the case of alternating current arcs.

In operations for welding along a path of considerable extent, e. g. as in pipe manufacture, means are provided for effectuating or facilitating the relative motion between the arc electrode feeding and holding means, and the work itself. In one type of apparatus for making pipe, the pipe blanks are advanced by a multiplicity of driving rolls and are guided by associated aligning rollers and the like, all mounted in the requisite supports, roller cages and frame structure of necessarily heavy construction and more or less surrounding the pipe throughout much of its path. In accordance with common practice of the welding art, the usual expedient under such circumstances is to embody the current return path as a grounded circuit, by connection through the frame, supports, rollers and like instrumentalities; the arc current thus flows through the work to the rollers or rolls engaging the pipe surface and thence through the supporting structure and framework to the current source.

Not only is there likelihood of difficulty in making such electrical contact with the pipe blank or the like, particularly in attaining uniformity of such contact despite scale or irregularities at the surface of the work, but the excessively large current, traveling through the supporting frame, rollers and other structural elements, which are all customarily of steel or other magnetic material, sets up magnetic fields of corresponding magnitude in such elements. It has now been found that these fields have a deleterious influence on the welding arc, causing it to be disturbed (i. e. to "blow") in an erratically intermittent manner, with consequent deformity and impairment of the welded seam. Since the arc current may run from several hundred to 1000 amperes or more, the arc itself may be considered as a movable conductor carrying a very large current, and under the influence of a magnetic field, will tend to be displaced by electromagnetic effect.

The reaction, moreover, between the arc and an adjacent magnetic field produced by the same current, seems to be unstable and erratic. For instance, it appears that incipient blowing or displacement of the arc tends to change its current, and thus to modify the electromagnetically produced force on the arc, in such direction as to enhance the blowing or disturbing influence, so that the arc is at least momentarily further displaced, for example to one side or the other of the weld locality. The resulting lengthening of the arc appears then to effect a reduction of its current, with a following change in the magnetic field, in some way leading to restoration of the arc to its original condition and position, whereupon the cycle may begin again. At some stages in such cycles, moreover, abnormally high current may flow, overheating the weld locality. Whether the particular series of events just described is a complete or accurate explanation of the actual phenomena is difficult to determine, but it has now been abundantly established that the magnetic fields caused by the arc current in surrounding structure, especially where any such field has a predominant direction in the vicinity of the arc, tend to cause erratic operation and corresponding impairment and lack of uniformity in the welded joint or seam.

The described effects are heightened, moreover, where a plurality of arcs are employed to cooperate in forming the desired weld cavity along the edges to be joined and in filling the cavity with molten metal. For example, one such arrangement involves two electrodes, respectively connected to establish separate arcs to the work, the electrodes being disposed one ahead of the other in rather close proximity along the path to be welded. Disturbance due to nearby magnetic fields has been found particularly troublesome, since a field produced by the current from one arc may affect the other as well as the first, and blowing or other misbehavior of either arc alone is sufficient to interfere with attainment of the desired results.

Accordingly an important object of the present invention is to provide, in electrical welding apparatus, improved current collecting or conducting means, affording superior electrical contact with the work and particularly serving to minimize the establishment of magnetic fields such as would impair the welding operation. Another object is to afford improved welding apparatus of the electric arc type, wherein a return current path is provided through the work but in such fashion as to avoid a predominant magnetic field in disturbing relation to the arc.

Further objects are the provision of new and more effective instrumentalities associated with electric arc welding means, for effecting electrical connection to the work, and especially for insuring constant welding current and therefore uniform welding conditions at all times, while permitting the desired continuous or other relative motion between the work and the assembly constituted by the welding electrodes and the current collecting means. A still further object is to afford novel pipe-welding apparatus wherein a seam is welded along the longitudinal cleft of a pipe blank, especially pipe of a large diameter, and wherein improved and more uniform electrical contact and a remarkable avoidance of disturbing magnetic effects are achieved, as the pipe is advanced relative to the welding devices.

Another and more general object is to provide improved welding means of the electric arc type arranged for relative motion between such means and the work and including novel and more effective current conducting instrumentalities for completing the arc energization circuit between the work and the source of current, such instrumentalities providing uniformly low electrical resistance and being rugged and durable, so as to require little attention for service or replacement.

To these and other ends, certain presently preferred embodiments of the invention are shown in the accompanying drawings and hereinbelow described, by way of example to illustrate the features and principles of improvement.

In the drawings:

Fig. 1 is a view, taken in section on a longitudinal vertical plane but showing most parts in elevation, of certain portions of pipe-manufacturing apparatus embodying the present invention;

Fig. 2 is a transverse vertical section, taken on line 2—2 of Fig. 1.

Fig. 3 is a fragmentary, enlarged view, taken in vertical section on line 3—3 of Fig. 1;

Fig. 4 is a fragmentary section on line 4—4 of Fig. 1;

Fig. 5 is a detail view of one of the mounting devices for the electrical contact means, taken chiefly in vertical section through a medial plane parallel to the plane of Fig. 3;

Fig. 6 is a perspective view of a bracket structure shown in Figs. 1, 2, 3 and 5, with certain parts removed;

Fig. 7 is an exploded, perspective view showing the relation of one of the contact means and a number of mounting parts to be associated with the structure of Fig. 6;

Fig. 8 is a schematic view, taken generally in plan, showing a simplified electrical wiring diagram for the apparatus of Fig. 1;

Fig. 9 is an enlarged fragmentary section on line 9—9 of Fig. 1, showing the welded seam;

Figs. 10-A, 10-B and 10-C are views on a vertical plane through the cleft of the pipe of Fig. 1, Fig. 10-A showing a cleft edge before welding, Fig. 10-B (in section) the welded seam produced in accordance with the invention, and Fig. 10-C (in section) showing an imperfect, welded seam as explained hereinbelow;

Figs. 11-A, 11-B and 11-C are respectively plan views of the cleft and seam portions shown in Figs. 10-A, 10-B and 10-C; and Fig. 12 is a schematic, perspective view illustrating another embodiment of the invention as applied to a traveling welding unit.

As indicated hereinabove, the invention has been found of peculiar advantage in pipe-manufacturing apparatus, specifically in equipment for making pipe of large diameter from tubular pipe blanks having a longitudinal cleft, the apparatus functioning to weld a seam along the cleft. Accordingly Figs. 1 to 8 inclusive illustrate the invention as embodied in apparatus of the character explained.

Referring to Figs. 1, 2 and 3, the apparatus is adapted to receive successive, long pipe blanks, say of the order of dimensions and wall thickness mentioned above, such a blank being indicated at 20 and being advanced axially through the apparatus in the direction of the arrows, as by suitable pinch rolls or the like, indicated by one set of same at 21. In addition to such preliminary driving, guiding and aligning rollers, the machine includes an assembly of guiding and steadying instrumentalities generally described as a chuck 22, through which the pipe blank passes, for the welding operation along its cleft 24 by arc welding means generally designated 25, it being appreciated that the cleft is disposed at the uppermost surface of the pipe and thus travels in a horizontal line at the top of the pipe path through the chuck.

To hold the advancing pipe blank steady and particularly to prevent any mutual motion of the cleft edges, the chuck 22 includes a number of sets of rollers 26 mounted in suitable cages 27, such sets being distributed circumferentially about the pipe as shown in Fig. 2, and each set including a multiplicity of the rollers 26 in a spaced array lengthwise of the pipe travel. Other rollers 29 are mounted in two like arrays or sets by corresponding, massive cages 29a, along respectively opposite sides of the cleft 24 for similar rolling engagement with the surface of the pipe blank. The supporting structure for the various roller cages includes transverse end plates 30, 31 carried by frame structure 33, which surrounds the path of the pipe and which also, as explained below, supports the welding instrumentalities. It is therefore seen that as the pipe is pushed endwise through the chuck, it is held by roller means in firm, compressive engagement at a multiplicity of points, distributed both longitudinally and circumferentially.

The arc welding operation on the cleft 24 is of the type wherein an arc is maintained from an electrode wire to the pipe surface at the meeting cleft edges (which are fully closed as the pipe blank enters the chuck), the electrode wire being consumed rapidly and being continuously fed from a suitable supply. In the illustrated apparatus, a combination of two such arcs is employed, represented by the electrode wires or rods 35, 36, which extend downwardly toward the cleft line 24 at localities closely spaced in a longitudinal direction. The wires 35, 36 are fed to the arcs respectively through guiding nozzles 37, 38 and feed tubes 39, 40 from suitably controlled advancing means generally indicated at 41, 42, which receive the wires from appropriate reels, not shown, it being understood that the arc feeding and control instrumentalities may be of any suitable, known type. The described welding devices are conveniently mounted on supporting means generally designated 44, carried by the frame 33, above the chuck, so that as the pipe advances, the arcs maintained between the electrode wires and the pipe produce the desired welded seam. A thick layer of finely granular flux 46, beneath which the ends of the wires 35, 36 are buried for submerged operation of the arcs, may be continuously deposited on the pipe surface, in bridging relation to the cleft, from a supply tube 48.

While other electrical connections or arrangements may in some cases be employed, particularly effective results have been had by connecting and operating the electrode 35 as a direct current arc and the electrode 36 as an alternating current arc, the D. C. arc 35 first engaging the weld locality and the A. C. arc 36 serving to complete the weld and to insure proper establishment of molten metal along the seam. As the pipe with the welded seam travels beyond the locality of the arcs toward its emergence at the plate 30, it continues to be held by the chuck rollers until the metal is fully solidified and set.

The apparatus also includes a carriage device 50 which is disposed internally of the passing pipe and includes upper and lower rollers 51, 52, bearing on the inner wall of the pipe, as well as rollers 53, 53a (Fig. 2) correspondingly engaging the pipe wall at the sides. The carriage device thus cooperates in guiding and aligning the pipe and the edges of the cleft, and also supports a copper chill block indicated at 54, beneath the locality of weld. The carriage 50 is supported by a boom or mandrel pipe 55, which extends rearwardly inside the pipe blank and is clamped, at a remote locality, by suitable means, here simply exemplified as a hanger device 56 which is in turn firmly suspended by a thin but rigid plate or ligament 57, traversing the cleft 24 of the passing pipe blank (with the necessary clearance) and mounted to appropriate stationary supporting structure 58. At the locality of the ligament 57, the pipe cleft is kept open, as by suitable fin roller means indicated at 60 as part of the rolls 21, means of this and supplementary character (not shown) serving to align the cleft before it is finally closed at the chuck 22.

Since the arcs from the electrodes 35, 36 extend to the work, the path of current flow accordingly includes the steel pipe wall itself. Instead of constituting the current return as a grounded circuit through all of the rollers that engage the pipe and thereby in effect strongly magnetizing the entire chuck assembly including its upper rollers 29, cages 29a and frame 33, the apparatus includes special and improved current collecting or contact structure, here embodied in a pair of sets of wire brushes generally designated 62, 63, supported on the carriage 50 and arranged in compressive, sweeping engagement with the inner wall of the pipe blank 20. As explained in more detail below, the brush means are in effect mounted with, and insulated from, the arc electrode means, i. e., in stationary relation to the welding devices (for motion between the work and the combination of welding and brush means), the electrodes and brushes in the illustrated apparatus being operative on work surfaces that face in opposite directions.

More specifically, each set 62, 63 of the brushes may comprise several elongated brush elements 65 arranged side-by-side and aligned in the direction of pipe travel, with their free, brushing edges 66 disposed against the inner pipe surface. While for some purposes a single unitary brush structure may be employed or greater numbers or other arrangements of the brush elements, the arrangement shown has been found particularly convenient and effective for apparatus and operations of the illustrated type.

The precise mounting and arrangement of the brush element 65 is shown, with respect to one of the sets 62, 63 (which are identical except that they face in opposite directions) in Figs. 5, 6 and 7, as well as more generally in Figs. 1, 2 and 3. A plurality of bracket devices generally designated 68 are mounted on the carriage 50 at each side, in spaced arrangement, there being two such devices for each of the brush assemblies 62, 63 in the present machine. As shown in Figs. 3 and 5, each assembly 68 includes a bracket frame 69 having a base portion 70 which is bolted to appropriate supporting structure 71 of the carriage body 50. The frame 69 has a rear vertical wall 72 and a top portion constituted by a pair of sloping strips or plates 73, 73 which have downward return portions 74, 74 welded to the base 70, the upper ends of the strips 73 being similarly welded to the upper edge of the wall 72. The plates 73 are spaced to provide a wide intervening slot 75, which in effect continues as an opening 76 partly down the rear wall 72. A T-shaped anvil member 77 having a hole 78 through its lower part, is welded in the notch constituted by the spaces 75, 76 where the plate 73 and the wall 72 meet. A long bolt 80 traverses the opening 78, with its head 81 seated against the rear face of the anvil block 77, and serves to support and hold the several clamping means for brush elements 65.

Each brush element, for example, may conveniently comprise a long metallic, e. g. thin steel clip 83 (Figs. 5 and 7), having a narrow U-configuration in cross-section, and gripping the end portions (or loops) 84 of a multiplicity of steel wires 85 which thereby constitute the wire brush. While other constructions and materials may be employed, the devices shown are durable and simple in structure and permit good mechanical and electrical engagement on the outer surfaces of the clip 83. The wires 85 may be fine but moderately stiff and springy, and are preferably crinkled or zig-zag in shape throughout their lengths as shown; such crinkling, or crimped shape, enhances their resilence and permits them to bend readily under pressure against the pipe wall, without breaking and yet with maintenance of effective electrical contact. As stated, they may be rather fine, there being many hundreds of them (each projecting about 2 inches or so above the clip 83) in a single element 65, say 3 feet long.

In mounting the brush elements 65, as a parallel group on the bracket frames 69, a backing plate 90 is employed, coextensive in length with the brush elements and having a width corresponding to that of the completed assembly. The plate 90 is thick enough to be essentially rigid, and is preferably made of copper or like material of superior electrical conductivity. Having a pair of rectangular openings 92, 92 each equal in width (i. e. lengthwise of the plate) to the opening 75 of the bracket frame 69, the plate 90 is disposed on the face of each pair of the strips 73 with one end of the corresponding opening 92 hooked under a projecting ledge 94 of the anvil element 77. The plate 90 can, for instance, be fitted in such position on the brackets 69 before they are mounted on the carriage 50; or even if the brackets are already installed, the plate 90 can be located on them before the anvil members 77 are inserted and welded in place.

The several brush elements 65 are then seated longitudinally on the surface of the plate 90, and separated by T-shaped spacer elements 96 (of which only some are shown in Fig. 7) which extend over plate 90 at the sides of the opening 92, and thus indirectly over the strips 73, with their apertured tail portions 97 projecting through the openings 92, 75 to be traversed by the bolt 80. Spacing collars 98 are placed on the bolt intermediate the spacers 96 and a further, apertured spacing member 99 is fitted on the lower or outer end of the bolt against the lowermost one of the spacers 96.

Accordingly, upon tightening a nut 100 threaded on the remote end of the bolt, the entire assembly of collars 98 and spacers 97 is firmly clamped together, correspondingly clamping the sides of the brush clips 83 between the cross portions of the spacers 96. The faces of the spacers 96, i. e. at the cross portions, are preferably sloped outwardly at the top as shown so as to crimp and bend together the upper edges of each U-shaped clip 83, thus more firmly holding the brush elements, both for the sake of improved grip of the wires 85 and especially for compressive engagement of the backs of the clips (by the wedging effect of the spacers 96) with the face of the long plate 90. The arrangement of the parts as just described will be clearly seen in Fig. 5, the relationship being also indicated in Fig. 7, where for clarity all but one of the brush elements 65, and several of the spacing parts 96, 98, are omitted.

In this way the several brush elements are firmly but removably clamped to the bracket structures, in the desired parallel array for engagement with the inner surface of the pipe wall, the carriage and its associated rollers 51 to 54 serving to maintain the brushing ends of the elements in firm sweeping engagement on such wall or surface. The described clamping structures also afford thorough electrical contact, i. e. between the back of each clip 83 and the plate 90 and also between metallic spacers 96 (of bronze or the like) and the sides of the clips. Direct electrical connection from each of the assemblies 62, 63 may be made to the plate 90 as indicated by a lug 102 and attached wire 103 in Fig. 7.

As shown in Fig. 1, the wires 103, in fact constituted by two wires 103a, 103b from the respective plates 90, extend back along the mandrel pipe 55 for ultimate connection to the electrical circuit of the welding apparatus. While it may in some cases be feasible to ground these connectors to the frame of the machine or the like, e. g. at a point quite remote from the welding locality, it is at present preferred to keep the conductors insulated (thus being of insulated wire as shown) for as much separation as possible of the current path from the equipment. Even though the brush and plate assemblies 65—90 are in contact with the metallic supporting structures, appropriate insulation of the remainder of the circuit contributes to avoidance of appreciable current flow through the frame or other parts of the pipe-handling apparatus.

Hence at a very remote locality, i. e. to the rear of the welding means, a supporting ligament structure 105 extends freely through the cleft 24 of the pipe blank in the same manner as the ligament 57, being secured to the supporting frame 58 and carrying two sets of projecting arms 106, 107 (see also Fig. 4) which through intermediate insulating spacers 108, 109 serve to clamp a pair of thin conductive plates 110, 111 to which the wires 103a, 103b are respectively connected, the plates being preferably made of copper or like metal. As shown, the plates 110, 111 thus pass through the cleft 24 with very ample clearance, the plates being thinner than the ligament 105 and it being understood that at this stage of pipe blank advance means such as the fin rolls 60 keep the cleft open to a sufficient extent for it to pass all of the described instrumentalities 105, 110, 111 and 57.

Further connection to the electrical welding circuit from the plates 110, 111 is made through wires 112, 113 connected at the respective upper ends of the plates. It will now be seen that the brush arrangements provide effective brushing contact with the interior surface of the pipe wall throughout a preferably long region extending beside the path of the cleft and thus beside the path of welding operation, electrical connection from the brushes being effectuated at a remote locality, as by the described devices. It will be noted that the brush assemblies also extend well ahead of the localities of the electrodes 35, 36 and are disposed relatively close to the welding path and to special advantage, on the opposite side of the work (i. e. the wall of the pipe blank) from the welding arc means.

Fig. 8 illustrates diagrammatically one circuit arrangement for connection of the brushes and welding electrodes, particularly suitable for double arc operation of the sort described above, it being understood that other circuits and schemes of connection may be employed in many cases. As shown in Fig. 8, the brush assembly 62 constitutes return connection for the circuit of the D. C. arc electrode 35 while the assembly 63 similarly provides return connection for the A. C. arc electrode 36, it being understood that similar connections may be employed where other welding procedures are used, e. g. involving two D. C. arcs or two A. C. arcs. In simplified form, a D. C. circuit, for instance, omitting control and supplemental devices such as may be additionally or alternatively employed in a manner understood by those skilled in the art, may extend from the electrode 35 through conductor 115, adjustable control resistance 116, D. C. generator 117, and return conductors 112, 110 and 103a to the brush assembly 62 (via its plate 90, not shown in Fig. 8) for current flow between such brush assembly and the work end of the arc, through the intervening wall region of the pipe 20. An A. C. arc circuit, for example, may similarly extend from the electrode 36 through conductor 120, the secondary 121 of a transformer 122 and conducting elements 113, 111 and 103b back to the brush assembly 63 for similar current flow between the work end of the A. C. arc and the brushes, via the intermediate region of the pipe wall, supplemental control devices being omitted, for clarity, from the circuit shown.

By way of simple illustration of further control structure, the generator 117 has an adjustable shunt field circuit indicated at 124 and the transformer 122 may be adjustable in coupling or otherwise for control of the e. m. f. supplied to the A. C. arc circuit. The primary 126 of the transformer may extend to suitable alternating current supply, not shown.

As explained, the brush assemblies in the structure of Figs. 1 to 7 are preferably located close to the line of weld, say not more than several inches or so away, and extend for a relatively considerable distance along the path, advantageously at least, say, 6 to 10 inches or more ahead of the arcs in the direction of pipe advance and as much as 2 feet or more, if desired, rearwardly along the unwelded part of the cleft. Since the great majority of the multitudinous individual wires constituting the brush assemblies are at all times in electrical contact with the pipe surface, it being estimated that at least 60% or more of them are at any one time in effective contact, current from each of the arcs (of whatever type they may be) flows to its return brush connection in practically all directions throughout a considerable angle, indeed nearly 180° in the arrangement of Fig. 8. Thus with respect to the arc from the electrode 36, current flows in an infinite multiplicity of paths, bounded, say, by the lines 128, 129 which are almost aligned with the cleft 24. Similarly current from the arc 37 flows in a like infinite number of paths between the lines 130, 131 likewise meeting at an angle of nearly 180°. In consequence magnetic fields set up by such current flow in the wall of the steel pipe run in a variety of directions, indeed an infinite variety of directions in the device shown, angularly distributed throughout nearly 180° on each side (at least, say, 140°), so that there is no predominant field in any one direction, even in the pipe wall.

These conditions of current distribution are the same in the case of both the arcs shown, and have been found to contribute materially in minimizing disturbance of one or more arcs by magnetic effects. Although the illustrated disposition of the brushes (Fig. 8) extending ahead of as well as behind the welding point seems to provide optimum advantage and is at present preferred, very effective results have been obtained with the brushes otherwise disposed, for instance so that their forward ends are about opposite the electrode means and the remainder of them wholly to the rear, but parallel to the cleft line in the same way. While such rearward brush location may not afford so very great an angular distribution of fields, there is practically no magnetic disturbance of the arc or arcs; the paths of current flow, in the work, are still in effect relatively short, nor is there any single predominant field to influence the arcs. Furthermore, it is of special and important advantage that the magnetic fields are kept constant and uniform at all times. In addition, fields effective above the surface of the work have, in all of these arrangements of brushes, been minimized to a great extent. In fact since there is no return current conductor whatever outside the outer surface of the pipe blank, and indeed no current carrying means, magnetic or otherwise in the vicinity of the welding arc or arcs (it being remembered that even non-magnetic conductors such as copper and brass may set up a substantial field with large current flow through them) the likelihood of arc disturbance is correspondingly and greatly reduced, all despite the high value of welding arc currents, e. g. 500 to 650 amps. for a D. C. arc and 750 to 850 amps. for an A. C. arc. Indeed in the specific arrangement shown in these views, the wall of the pipe blank itself constitutes a magnetic shield preventing extension of fields to the vicinity of the arc, i. e. fields in a direction which would cause either of the arcs to blow or be otherwise disturbed or disarranged.

By way of example, Fig. 9 shows in section a welded seam produced by apparatus of the character shown in Figs. 1 to 7, the edges 134, 135 of the wall of the pipe 20 meeting at the cleft line 24 and the body of solidified weld metal being shown at 136, filling the weld cavity (formed in the course of the welding operation) and extending somewhat upward as a wide bead on the surface of the finished pipe. It will be understood that although the lower part of the cleft 24 is unwelded in the specific operations described, a subsequent internal welding operation may also be performed (and may also embody features of the present invention) to produce a corresponding seam along the inner line of the cleft. Under the prescribed circumstances, it is very desirable that the penetration of the weld metal, i. e. the extent to which the body 136 (or the corresponding cavity, filled with weld metal) projects below the surface of the pipe wall, be uniformly of a desired depth throughout the welded seam, for example, a depth more than ½ the thickness of the pipe wall and indeed sometimes even greater than is indicated in Fig. 9.

Figs. 10-A and 10-B are longitudinal sections and Figs. 11-A and 11-B are plan views, showing respectively the unwelded cleft and the welded seam produced in accordance with the present invention. As will be noted, the body of weld metal 136 penetrates to a uniform extent throughout the seam, i. e. terminating at the essentially straight horizontal line 140 all the way along the weld path. Similarly the bead constituted by the metal 136 (Fig. 11-B) is essentially uniform in its relation to the cleft line 124, the edges of the bead being uniformly spaced at approximately equal distances, throughout, from the original cleft line 24.

Figs. 10-C and 11-C are views similar to Figs. 10-B and 11-B, but showing seam structures which have been found to result with faulty arc operation, such as occasioned by blowing and derangement of an erratic, intermittent character due to disturbing magnetic influences. As will be seen, the penetration of the weld metal varies widely and irregularly as shown by the irregular line 142 in Fig. 10-C, and the body of weld metal, i. e. as represented by the bead 136a in Fig. 11-C, wanders erratically back and forth across the cleft line 24. Such a seam is generally undesirable, being susceptible of weakness or faulty joining at many localities and indeed representing uneven strains and stresses in the wall of the pipe or other structure intended to be joined by the welding operation. In contrast, the present apparatus has afforded remarkably uniform, undisturbed arc operation, providing correspondingly uniform welded seams, easily controlled for proper position, penetration and alignment of the weld metal as shown in Figs. 10-B and 11-B.

Not only do the brush assemblies 62, 63 or like wire brush means provide substantial improvement in the welding operation in the manner described above, but they afford remarkably good electrical contact for the welding circuit, i. e. between the work and the return side of such circuit. Irregularities or unevenness in the surface of the work, i. e. the surface of the pipe, have practically no deleterious effect on the electrical contact, since the natural resilience of the multitudinous individual wires keeps them in firm engagement. Similarly patches of scale, rust or the like which might tend to separate rolling contact surfaces by the poorly conductive layer of such scale or other foreign substance, apparently have no effect on the electrical contact of the assemblies here provided. That is to say, even though some part of the brushes may be engaged with such region of the work surface, all of the other brush wires remain in contact with other areas of good conductivity and there is never any detectable fluctuation of the current in the welding circuit by reason of poor electrical contact.

The brush arrangements, moreover, have been found to have remarkably long life and to require little attention. In some types of operation, it may be desirable to clean accumulated particles of scale and dirt from the brushes at regular intervals (say once a week); experience has been that even in continuous, 24-hour, operation of apparatus for making large diameter pipe, a set of brushes 65 will remain fully operative and effective for a period of a month or more, i. e. before wear of the wire ends, by reason of the heavy pressure under which they are urged against the pipe, occurs to an extent requiring replacement. While other types of brushes may be employed, the fine crinkled wires in the illustrated devices have been found peculiarly effective, for good resilient contact, it being noted that despite the use of steel (rather than copper, brass or bronze) for the brush wires, no appreciable resistance is introduced, the thousands of wires in each assembly constituting, in parallel, a conductor of practically no resistance. Similarly, while other mounting arrangements may be used, the structure illustrated in Figs. 3, 5, 6 and 7, not only affords firm grip and electrical contact but permits ready dis-assembly for replacement of the brush devices 65 when necessary.

As indicated hereinabove, structures embodying one or more of the described features are fully applicable to a wide variety of other welding operations. Simply for example, Fig. 12 shows in very schematic manner, a traveling welding unit generally designated 200, such as might be used for welding a butt seam 202 between two pieces of sheet or plate material 203, 204, the welding unit 200 traveling on wheels or rollers 205, which may ride on the surface of the work (or other guiding support if desired), the device being appropriately propelled and guided so that its welding electrode 206 follows the seam line 202, for operation of the welding arc between the electrode and the work 203—204. For simplicity of illustration, Fig. 12 omits representation of the bead which the arc has formed in welding the seam, and also omits such supplemental details (if used) as the deposition of flux ahead of, and removal of such flux behind, the welding arc.

Instead of depending on rolling or other contact through the structure 200 or otherwise for return electrical path from the work, the device includes an elongated wire brush structure 210, in brushing engagement with the surface of the work. For example, the brush structure may consist of two long arms 211, 212 joined by a transverse length of brush 213 in a U-shaped configuration, the brushes 211, 212 extending lengthwise of the seam 202, preferably at both sides thereof and both ahead and rearwardly of the arc in the same manner as described hereinabove. The element 213 constitutes further brushing contact across the work at a locality spaced remotely rearward of the arc. The described assembly can be carried on an arm structure 214 from the welding apparatus 200, and is preferably electrically separated therefrom by insulating spacers 215. The welding nozzle structure 218 is similarly insulated at 220 so that the welding electrode wire 206 supplied (by means not shown) from the apparatus 200 is similarly insulated from metallic parts in the vicinity of the weld operation. The wire 222 connected to the metallic backing of the brush assembly at the side nearest the apparatus 200, constitutes connection for the return portion of the welding circuit, in the same manner as the leads 103 in Fig. 1. The arc energizing and control circuit is completed in the device 200 and current is appropriately supplied to the latter from an external source, all by means which may be conventional and are therefore not shown.

It will be noted that apart from the remotely located bridging section 213 of the brush structure, there is preferably no return current conductor crossing the path of weld, nor indeed is there any return current structure in the vicinity of the arc, apart from the brush elements. As in Fig. 8, the return current flow from the arc preferably travels in a large variety of directions through a very wide angle in the body of the work, to the brush assembly. Thus the production of magnetic fields is greatly reduced or minimized, or held uniform so conditions do not vary because of any movement between the welding point and the work ground connection, and at the same time uniform electrical contact is effected with the work, the weight of the brush assembly (supplemented, if necessary, by heavy weights, not shown, on an outer part of the arm structure 214) or other pressure exerted from the structure 200 serving to keep the brushes in firm sweeping engagement upon the face of the plates 203, 204 as the brush assembly and the electrode, in stationary relation to each other, are moved along. While the location of the welding apparatus wholly at one side cooperates in preventing undue magnetic fields, the specific arrangements of brushes relative to the work and the arc electrode 206, are believed to afford very material advantage, in at least a number of the respects more fully explained above for Figs. 1 to 8. The brush devices 211, 212, 213 may constitute wire brushes having a multiplicity of fine, resilient metallic wires, each such element consisting, for instance, of one or more devices of the character indicated at 65 in the preceding views.

It will now be seen that the apparatus herein disclosed affords notable improvement in arc welding operations, particularly in maintenance of effective, low resistance contact in the welding circuit and especially in reducing or minimizing unwanted magnetic and like effects in the vicinity of the arc. The effectiveness of contact and essential uniformity of contact area are maintained at all times, despite irregularities, poorly conductive spots and the like on the surface of the work, the described brush arrangements (using highly flexible brush wires) being in fact peculiarly advantageous where the work has a corrugated or other uneven surface. In all cases, more uniform, and more accurately controlled, welded joints and seams are obtained. It will be noted that in the various embodiments shown, the brush structures are maintained in a fixed positional relationship to the weld locality, providing an essentially constant length of current path through the work and thus affording a correspondingly constant welding current at all times. This feature contributes materially to the uniformity of weld achieved with the present apparatus. The magnetic effects, moreover, are kept constant and uniform, so that the welding operation can be most readily controlled or adjusted for uniform results.

It is to be understood that the invention is not limited to the specific structures and operations herein described and shown, but may be carried out in other ways without departure from its spirit.

I claim:

1. In welding apparatus having an arc electrode element for welding operation along a predetermined path on a work element, said electrode element being connected for flow of arc current between it and the work element, in combination, means for moving one of said elements relative to the other to effect welding progressively along said path, and a wire brush, elongated in the direction of the path, engaging the surface of the work element close to the electrode element and for a relatively considerable distance along said predetermined path and electrically connected to carry arc current between the work element and the source of such current, said wire brush being carried with the electrode element, to sweep along the surface of the work element during operation of the first mentioned means.

2. In electrical welding apparatus, in combination, electrode means for welding by effect of current flow between said electrode means and the work to be welded, and a wire brush connected in electrical circuit with the electrode means and disposed in brushing engagement with the work close to the electrode means to make electrical contact and for carrying current between the work and another locality in the electrical circuit, said brush and electrode means being supported in common for relative motion between them and the work, and said wire brush being elongated in the direction of said motion.

3. In electrical welding apparatus, in combination, a welding electrode adapted for passage of an electric arc between said electrode and the work to be welded, a wire brush disposed in brushing engagement with the work close to the electrode to make electrical contact with said work, said brush comprising a support portion elongated along a substantially straight line and wire bristles projecting from said portion for contact with the work throughout a corresponding line on the work parallel to a path by the welding operation, said electrode and brush having connections for passage of arc current in series through said electrode, the work and said brush, and said brush being spaced from the electrode to prevent magnetic disturbances of the arc by flow of the arc current in the brush, and means mounting the electrode and brush in the aforesaid spaced relation and in disposition for relative motion between them and the work along a path parallel to the aforesaid elongated support portion.

4. In electrical welding apparatus, in combination, a welding electrode adapted for passage of an electric arc between said electrode and the work to be welded, a wire brush disposed in brushing engagement with the work to make electrical contact therewith, and circuit means adapted to extend to a supply of arc current and connected to said electrode and said brush for completing a circuit for the arc current through the work between said electrode and brush, said brush being mounted for relative motion between it and the work so that it makes sweeping contact with the work, and said brush being disposed to engage the work at a multiplicity of localities spaced from the electrode in a corresponding multiplicity of directions along the work.

5. In apparatus for manufacturing pipe, in combination, means for advancing axially a pipe blank having an axial cleft to be welded, welding electrode means disposed adjacent the pipe blank in welding relation thereto, to weld a seam along the cleft as the pipe blank is advanced by the first mentioned means, a wire brush connected in electrical circuit with the electrode means and disposed in brushing engagement with the pipe blank close to the electrode means and for a relatively considerable distance along the cleft and seam to make electrical contact with said pipe blank, and means mounting said brush in stationary relation to the electrode means.

6. In apparatus for manufacturing pipe, in combination, means for advancing axially a pipe blank having an axial cleft to be welded, welding electrode means disposed adjacent one surface of the wall of the pipe blank in welding relation thereto, to weld a seam along the cleft as the pipe blank is advanced by the first mentioned means, a wire brush disposed adjacent the opposite surface of said wall of the blank, in brushing engagement with said opposite surface close to the welding electrode means and for a relatively considerable distance along the cleft to make electrical contact with said blank, means mounting said brush in stationary relation to the electrode means, and circuit means connected to the electrode means and having a lead connected to the brush, to effect flow of welding current in series through said electrode means, pipe blank wall, brush and lead, said lead extending from said brush on the same side of the wall as the brush to a locality remote from the electrode means.

7. In electrical welding apparatus for welding along a predetermined path, in combination, welding electrode means disposed adjacent the work for welding along said path, elongated wire brush means adapted for brushing engagement with the work for electrical contact therewith throughout a correspondingly elongated region and disposed to engage the work along such region close to said path and extending a relatively considerable distance lengthwise thereof, said electrode means and brush means being adapted for connection in a circuit supplying current to flow in series through said electrode means, the work and the brush.

8. In electrical welding apparatus, in combination, a welding electrode adapted for passage of an electric arc between said electrode and the work to be welded, an elongated wire brush adapted for brushing engagement with the work to make electrical contact therewith throughout a correspondingly elongated region, and means mounting said brush to engage the work along such a region which extends in opposite directions from a line normal to it from the electrode, so that upon relative motion between the work and the aforesaid combination of electrode and brush such that the electrode follows a path substantially parallel to the brush, the brush continuously projects both ahead and rearward of the electrode.

9. The apparatus of claim 8, which is adapted to weld a seam along a predetermined path on sheet-like work, and which includes means mounting the electrode at one surface of the work to follow the predetermined path upon relative motion between the electrode and the work, said mounting means for the brush disposing the latter at the opposite surface of the work in sweeping contact therewith and in substantially parallel relation to the aforesaid path.

10. In apparatus for welding a longitudinal seam along a pipe, in combination, supporting structure adapted for mutual displacement between the pipe and said structure longitudinally of the pipe, arc electrode means carried by said structure and disposed externally of the pipe to weld the seam during the aforesaid displacement, mounting means extending inside the pipe and carried by said structure, and wire brush means held by said mounting means against the inner surface of the pipe in brushing engagement thereon for electrical contact therewith, said brush means engaging the pipe close to the weld and for a relatively considerable distance axially of said pipe, said electrode means and wire brush means having electrical connections adapted for inclusion of said electrode means and brush means in arc-energizing circuit.

11. The apparatus of claim 10 wherein the brush means comprises a plurality of elongated wire brush elements, each element being adapted for brushing engagement along an elongated region, said mounting means comprising means clamping said brush elements in side by side relation with the elements extending longitudinally of the pipe.

12. The apparatus of claim 11 wherein each brush element comprises an elongated metal clip of U-shaped cross section, and a multiplicity of crinkled wires projecting from the clip with their ends held therein, the mounting means including a conductive backing plate extending under the clips of the brush elements, and the clamping means comprising a plurality of wedging members respectively intermediate the elements and adjacent the clips thereof and means compressing said members and clips to wedge the latter together and against the backing plate.

13. The apparatus of claim 10 wherein the brush means comprises two elongated wire brush devices, said mounting means holding said devices against the inner pipe surface at opposite sides respectively of the seam path, in brushing engagement with elongated regions of said surface substantially parallel to said path.

14. The apparatus of claim 13 wherein each brush device comprises a plurality of elongated wire brush elements and wherein the mounting means comprises a common connecting element for the brush elements of each device and means holding the brush elements side by side and substantially parallel to the seam path, with the brush elements extending substantially forwardly as well as rearwardly of the electrode means.

15. In electrical welding apparatus, current collecting means for return electrical contact with work to be welded, comprising a plurality of elongated wire brush elements to be disposed in brushing engagement with the work, each element having an elongated back portion, a conductive backing plate disposed under the back portions of the brush elements, said plate having an opening extending transversely of the elements, a plurality of T-shaped spacers disposed respectively between and at the outer sides of said plurality of brush elements with the cross portions of the spacers overlying the backing plate and the tail portions of the spacers projecting through said opening, and mounting means including clamping means traversing said tail portions of the spacers on the opposite side of the plate from the elements, to hold the elements together and against the backing plate.

16. In electric arc welding apparatus wherein a weld is to be produced along a predetermined line on the work, in combination, welding electrode means for producing a welding arc between said means and the work, means mounting said electrode means for relative motion between the latter and the work in the direction of the predetermined line to be welded, so that the arc follows the line, said electrode means being adapted for connection in an energizing circuit to have a return path for arc current extending through the work from the arc, and current-collecting means for connecing the work in said circuit, said current-collecting means providing constant electrical and positional characteristics for the arc current return path relative to the arc, for maintaining uniformity of arc current and of magnetic effects due to said current, said current-collecting means including contact means adapted for continuously engaging the surface of the work throughout a predetermined region close to the electrode means and for a relatively considerable distance along said line, and means mounting said contact means in predetermined stationary relation to said welding means, for the same aforesaid relative motion between the contact means and the work as between the electrode means and the work, without disturbing said predetermined relation.

References Cited in the file of this patent

UNITED STATES PATENTS

| Number | Name | Date |
|---|---|---|
| 467,752 | Howard | Jan. 26, 1892 |
| 1,135,539 | Mack | Apr. 12, 1915 |
| 1,381,647 | Knoll | June 14, 1921 |
| 1,452,762 | Schroder | Apr. 24, 1923 |

(Other references on following page)

UNITED STATES PATENTS

| Number | Name | Date |
|---|---|---|
| 1,839,437 | Priebe | Jan. 5, 1932 |
| 1,872,008 | Richter | Aug. 16, 1932 |
| 1,906,987 | McDougall | May 2, 1933 |
| 1,972,029 | Norquist | Aug. 28, 1934 |
| 1,983,930 | Carlsen | Dec. 11, 1934 |
| 2,086,305 | Sessions | July 6, 1937 |
| 2,110,632 | Mitchell | Mar. 8, 1938 |
| 2,456,902 | Treuthart | Dec. 21, 1948 |
| 2,474,534 | Knost | June 28, 1949 |
| 2,495,544 | Peterson et al. | Jan. 24, 1950 |
| 2,543,906 | Ford | Mar. 6, 1951 |

FOREIGN PATENTS

| Number | Country | Date |
|---|---|---|
| 717,745 | France | Oct. 26, 1931 |